United States Patent [19]

Meyer

[11] E Re. 28,542

[45] Reissued Sept. 2, 1975

[54] HEAT-SEALABLE DEVICES FOR MARKING TEXTILE ARTICLES

[75] Inventor: Peter Meyer, London, England

[73] Assignee: Polymark Corporation, Cincinnati, Ohio

[22] Filed: July 26, 1973

[21] Appl. No.: 382,736

Related U.S. Patent Documents

Reissue of:

[64] Patent No.: 3,595,739
Issued: July 27, 1971
Appl. No.: 712,029
Filed: Mar. 11, 1968

[52] U.S. Cl. ..... 428/200; 40/2 R; 428/204; 428/346; 428/354; 428/476; 428/514; 161/229

[51] Int. Cl.[2] ..... B32B 27/10; B32B 27/34

[58] Field of Search ..... 161/6, 167, 227, 228, 229, 161/251, 413; 117/3.4, 14, 15, 60, 68.5, 76 P, 122 H, 122 PA, 122 PB, 122 PF, 151, 161 P; 40/2 R

[56] References Cited

UNITED STATES PATENTS

| | | | |
|---|---|---|---|
| 2,096,750 | 10/1937 | Lawrence | 117/68.5 |
| 2,631,947 | 3/1953 | Kline | 117/122 X |
| 2,853,404 | 9/1958 | Weinberg | 117/122 |
| 2,927,865 | 3/1960 | Lewis et al. | 117/15 X |
| 3,301,696 | 1/1967 | Taube et al. | 117/15 |
| 3,359,127 | 12/1967 | Meyer et al. | 117/3.4 |
| 3,616,176 | 10/1971 | Jachimowicz | 117/3.4 |
| 3,684,564 | 8/1972 | Lefrancois | 117/3.4 |

*Primary Examiner*—George F. Lesmes
*Assistant Examiner*—Charles E. Lipsey

[57] ABSTRACT

Heat sealable labels or the like and methods and marking articles by means of such labels are described. The label includes a flexible support incorporating a heat-curing film-forming resin system in the presence of alkylol or alkoxy alkyl groups and under acid conditions, and an information-bearing marking printed on said support. Such a label when heat sealed to a textile or other article is wash- and wear-resistant and withstands the various treatments to which the article may be subjected.

9 Claims, 1 Drawing Figure

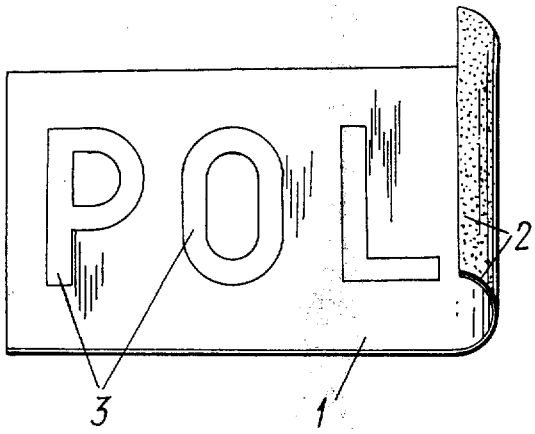
Inventor
Peter Meyer
By
Watson, Cole, Grindle + Watson
Attorney

HEAT-SEALABLE DEVICES FOR MARKING TEXTILE ARTICLES

Matter enclosed in heavy brackets [ ] appears in the original patent but forms no part of this reissue specification; matter printed in italics indicates the additions made by reissue.

---

The present invention relates to heat-sealable labels or like marking elements for applying markings or decorative effects to textile articles, fabrics or other sheet materials or to leather, wood, glass, plastics and so on, and to methods of marking articles, for the purpose of obtaining markings or decorative effects which are substantially resistant to wear, and in the case of textile and like articles are resistant also to repeated cleaning or washing of such articles.

U.S. Pat. No. 3,359,127, commonly owned by the assignee herein, describes methods and means for marking textile articles, including in particular heat transfers, wherein a temporary support receives a layer of a soluble polyamide in turn carrying a printed marking. This transfer is applied under heat and pressure to an article to be marked in the presence of a curing agent normally consisting of a solid organic acid mixed with the polyamide or it may be ammonium salt of such acid, which curing agent promotes cross-linking of the polyamide in the presence of alkylol or alkoxy-alkyl groups so that a relatively insoluble, inert and wear-resistant layer, incorporating the printed marking is bonded to the article, after which the temporary support is removed. This arrangement provides a highly resistant marking on the article which is of a permanent character and can be readily designed so as not to be liable to become degraded throughout, the life of the article even after repeated washing and cleaning operations.

The polyamides used may be soluble polyamides or copolyamides which can be converted into a highly inert and insoluble form by a curing agent in the presence of a cross-linking agent containing alkylol or alkoxy-alkyl groups, and such cross-linking agent may in some cases be a formaldehyde resin. Other compounds which can be used similarly are dispersions of an acrylic resin capable of being cross-linked at an elevated temperature.

The present invention is directed to a label or like marking device which offers substantially all the advantages of heat transfers produced according to the above-noted patent but which can be more economically produced and which has the further important advantage that the time cycle required for applying or bonding the marking to the article to be marked can in many cases be reduced as compared with the procedure involved in the above-noted patent, while, furthermore, the step of removing the temporary support can be avoided which results in a saving of time.

In accordance with the present invention a marking element comprises a flexible support incorporating a heat curing film-forming resin system in the presence of alkylol or alkoxy alkyl groups and under acid conditions, and an information-bearing marking printed on said support, to provide a marking element which substantially withstands various treatments to which the surface may be subjected. *More specifically, the support may consist of a thin permeable paper impregnated with the film-forming resin system, said resin being presented on the surface of the label to be bonded to the surface to be marked, there being a printed marking exposed on the opposite surface of the label.*

With such a marking element the support remains bonded to the surface and carries a marking or decorative pattern on the exposed surface. The ink used for producing the marking or decorative pattern preferably employs a medium consisting of a similar resin to that applied to the support so that after the application of heat and pressure the printed label, when bonded to a textile article, is not affected by repeated laundry or dry (chemical) cleaning treatments to which the article may be subjected.

One advantage of the present invention is that the support can be formed of a relatively inexpensive material such as paper. By using a thin permeable paper the presence of such support after bonding the label to the article is of no disadvantage and provides a backing for the marking or pattern carried by the label. The invention also contemplates the use of a fabric, for example a fine woven cotton fabric, or a thin foil of plastics.

Since the marking produced on the support is visible at all times, control of the printing or other operations used for producing the marking can be more readily effected than in cases where, as in the above-noted patent, the printed marking is overlaid by the temporary support and is thus not readily available for inspection, while, furthermore, the present invention offers the advantage that printing is effected in the normal configuration and not in reverse as is often necessary when the support is a temporary support which must be removed from the article after transfer has been effected.

The fibre- or film-forming resin may consist of a solubilised linear polyamide of the character described in the aforesaid patent and may consist of a nylon-type polyamide which has been converted into a soluble form containing alkoxy alkyl groups by treatment with an aldehyde such as formaldehyde, as described for example in British specification No. 591,382. Materials of this type are commercially available under the trademarks "Calaton" CA and CB (made by I.C.I. Ltd., and believed to be substantially identical to the substance previously sold under the trademark "Maranyl," or BCI Type 800 resins made by Belding Chemical Industries).

Alternatively alcohol-soluble copolyamides may be used in conjunction with a cross-linking agent containing alkoxy alkyl groups, and in this case the cross-linking agent may be a formaldehyde resin containing alkoxy alkyl groups.

A still further alternative is a cross-linking acrylic resin conveniently in the form of an aqueous dispersion such as that sold under the trademarks "Plextol" (made by Rohm and Haas of Darmstadt) or "Hycar" (British Geon, Ltd.).

Polyamide and copolyamide resins of the above types are soluble in alcohols or alcohol/water mixtures, and such resins may be applied in the form of alcohol or alcohol/water solutions. Acrylic resin dispersions may be used in the commercially available form or the dispersion may be thickened by suitable additions if required.

These solutions or dispersions are used as coating or impregnating agents and are self-curing under acid conditions. Particularly in the case of polyamide solutions, they may contain an organic acid curing agent or an acid-yielding compound such as an anhydride or an ammonium or amine salt. Suitable curing agents are preferably those acids or compounds which are solid at normal temperature. A typical organic acid is citric acid or alternatively ammonium citrate can be used. Such acids are convenient for the purpose because at room temperature they are substantially inactive in promoting cross-linking so that labels produced by coating a support with a resin solution and such a soluble organic acid, have a satisfactory shelf life and are not liable to be affected by long storage periods; nevertheless curing occurs rapidly and effectively when the labels are applied to the article to be treated, such application being conveniently at a temperature of the order of 150° to 250° C., preferably from 180° to 250° C., and at a specific pressure of about 20 to 100 lbs. per square inch.

After coating or impregnating the support and drying the coating at a temperature not exceeding 100°C. the desired pattern or marking is printed on the support and then dried. The printing ink used may consist of a medium which also is a heat curing resin together with suitable pigments and other additions appropriate to a printing medium, and the printing of the desired design or pattern may be effected by any normal printing processes, for example letterpress, offset litho, flexographic or gravure processes, or it may be produced by screen printing.

After printing, a continuous coating of the resin mixture may be applied to form a protective surface on the marking element. Where a continuous outer layer is applied as an overcoating on the printed or decorative marking there is a higher degree of protection of the marking, and it may even be possible to use normal types of printing media, for example flexographic shellac-based inks.

By using labels or like devices produced according to the present invention it is possible to complete the application and bonding of the label to the article to be marked in a total period of not more than 1 to 7 secondds permitting a very rapid and economical marking sequence.

Several examples of methods of carrying the invention into effect will be described hereinafter as applied by way of example to the production of the label-like element shown on the accompanying drawing in which a support 1 consisting of a thin absorbent paper is impregnated with a solution or dispersion of a resin according to one of the following examples and after drying may then be coated on one side with a further coating of the resin as shown at 2. This coating is on the under side of the label which is applied in contact with the surface to be marked.

The opposite face of the support 1 receives a printed pattern or design such as is indicated typically at 3 which is applied by a printing process in which the medium of the printing ink consists of a resin solution or dispersion. If desired an overcoating consisting of a continuous layer of the resin solution or dispersion is applied.

It will be seen that the pattern or design is produced by direct printing and that the design or pattern is visible to the operator when applying the label to the article to be marked. Such application is effected by means of a suitable heat-sealing press which bonds the coated rear surface of the support 1 to the article to be marked and effects curing and cross-linking of the resin component of the impregnation of the support, of the printed marking thereon and of any continuous layers which may be present to form a highly inert and resistant marking on the surface to be marked.

Various solutions and dispersions for use as coating or impregnating media are given below by way of example together with examples of additional components which may be present in the coating mixtures and inks, and a number of examples based on the use of certain of the solutions, dispersions and inks are set out in detail. In all cases the parts are given by weight:

TABLE I.

| COATING OR IMPREGNATING SOLUTIONS | |
|---|---|
| (1) N-methoxymethyl poly-hexamethylene diamine adipate | 15 |
| Industrial ethanol | 60 |
| Water | 25 |
| Triammonium citrate | 1 |
| (2) Terpolyamide of 21 parts hexamethylene diamine adipate, 54 parts ε-caprolactam, 25 parts hexamethylene diamine sebacate | 15 |
| Industrial ethanol | 70 |
| Water | 15 |
| Cross-linking agent | 6 |
| Maleic anhydride | 0.5 |
| (3) Copolymer of 45 parts hexamethylene diamine adipate with 55 parts of ε-caprolactam | 16 |
| Industrial ethanol | 70 |
| Water | 14 |
| Cross-linking agent | 4 |
| Citric acid | 1 |

TABLE II.—COATING OR IMPREGNATING DISPERSIONS

This table comprises cross-linking acrylic resins which may be polymers or copolymers of alkyl esters of acrylic acid or methacrylic acid comprising N-alkoxyalkyl acrylamide. Typical examples of commercially available products which may be used in accordance with the present invention are the following:

1. Plextol B58a
2. Plextol M17a
3. Hycar 2679

The commercially available dispersions may be utilised in carrying out the present invention in the form received by the makers.

TABLE III.

| PRINTING INKS | Parts |
|---|---|
| (1) Solution 1 of Table I | 100 |
| Titanium dioxide | 15 |
| Cadmium yellow | 3 |
| (2) Solution 2 of Table I | 100 |
| Phthalocyanine blue | 10 |
| (3) Solution 1 of Table I | 100 |
| Carbon black | 7 |
| (4) Solution 2 of Table I | 100 |
| Cadmium red | 10 |
| (5) Solution 3 of Table I | 100 |
| Carbon black | 6 |
| (6) Piextol B58a | 100 |
| Cadmium red | 8 |
| Water | 15 |
| Hydroxyethyl cellulose | 1 |
| Non-ionic wetting agent | 0.3 |

In preparing this ink the components other than the resin dispersion are pre-dispersed in the water before the resin is added.

| | | Parts |
|---|---|---|
| (7) | Solution 2 of Table I | 100 |
| | Carbon black | 6 |
| (8) | Solution 3 of Table I | 100 |
| | Titanium dioxide | 15 |
| (9) | An ink composition similar to ink No. 6 but in which the cadmium red is replaced by 5 parts of carbon black. | |
| (10) | An ink composition similar to ink No. 6 but in which the resin dispersion is replaced by Plextol M17a. | |
| (11) | An ink composition similar to ink No. 9 but in which the resin dispersion is replaced by Plextol M17a. | |
| (12) | An ink composition similar to ink No. 6 but in which the resin dispersion is replaced by Hycar 2679. | |
| (13) | An ink composition similar to ink No. 9 but in which the resin dispersion is replaced by Hycar 2679. | |
| | | Parts |
| (14) | Dewaxed shellac | 25 |
| | Industrial ethanol | 75 |
| | Chrome green | 15 |

In preparing labels in accordance with the present invention any of the resins of Tables I or II may be used, and the information-bearing marking may be produced by any of the inks of Table III other than ink No. 14. In many cases it is desirable, but it is not always essential to utilise coating or impregnating media and printing inks comprising the same resin. Different resins can be used for printing particularly in those cases where the information-bearing marking is protected by an additional coating as in Examples III, VIb and VII, or when the ink can be caused to bond strongly to the permanent support itself rather than the coating or impregnating resin as in the case of Examples II and VIa.

In many cases it may be desirable that plasticisers should be present in the coating or impregnating media and in the printing inks. In the case of polyamide solutions and inks containing polyamides, that is to say, the coating solutions of Table I and printing inks Nos. 1 to 5, 7 and 8, any of the following plasticisers may be used but it should be understood that this list is not exhaustive and that other suitable plasticisers are available and could be used.

TABLE IV.

| PLASTICISERS FOR POLYAMIDE MEDIA |
|---|
| N-ethyl toluene sulphonamide, |
| tris-dipropylene glycol phosphite, |
| polyethylene glycol. |

In the case of cross-linking acrylic resins such as the dispersions of Table II and printing inks Nos. 6 to 13, any of the following plasticisers can be used but again this list is not exhaustive.

TABLE V.

| PLASTICISERS FOR CROSS-LINKING ACRYLIC RESIN DISPERSIONS |
|---|
| dibutyl phthalate, |
| dioctyl phthalate, |
| tri-cresyl phosphate, |
| N-ethyl toluene sulphonamide. |

The plasticisers of Table V will normally be pre-emulsified with an equal weight of water and in the presence of 1% of a non-ionic wetting agent, for example one of the products sold under the trademark "Nonex" supplied by Union Carbide & Chemical Corporation.

All the printing inks in Table III including ink No. 14 are suitable for use in the flexographic or gravure printing processes. Inks Nos. 1 to 13 are also suitable for use by the screen printing process and in this case the industrial ethanol may be replaced by n-butanol or diacetone alcohol.

The cross-linking agent referred to in solutions 2 and 3 of Table I and in the corresponding printing inks Nos. 4, 5, 7 and 8 comprise compounds of formaldehydes with for example urea and melamine containing alkoxy alkyl groups which in some cases may be formaldehyde resins. These compounds may be selected from the following table which illustrates typical examples of suitable compounds but is not an exhaustive list of cross-linking agents.

TABLE VI.

| CROSS-LINKING AGENTS |
|---|
| N,N'-bis(methoxymethyl)uron, |
| tri-methoxymethyl melamine, |
| hexa-methoxymethyl melamine, |
| tetra-methoxymethyl urea, |
| urea-formaldehyde precondensate containing methoxymethyl groups |
| melamine formaldehyde precondensates containing methoxymethyl groups. |
| hexa-ethoxymethyl melamine, |
| urea-formaldehyde precondensates containing ethoxymethyl groups, |
| melamine-formaldehyde precondensates containing ethoxy-methyl groups. |
| N,N'-bis(methoxymethyl)meta-phenylene diamine. |

In preparing the solutions and dispersions based on the compounds and mixtures set out in the foregoing tables the fluid coating or impregnating media may be prepared by high-speed stirring except where commercially available dispersions are used in the form received by the makers. In the preparation of printing inks the pigments may be introduced by ball milling and additional substances such as the curing agents for example triammonium citrate or citric acid added with stirring. Coating or impregnating mixtures according to Table I or Table II may be applied to the permanent support in any convenient way as a continuous coating or by causing a continuous strip of the support material to pass through the coating or impregnating mixture. After such a coating or impregnation has been effected the support is dried at a temperature not exceeding that at which substantial cross-linking of the resin occurs, preferably below 100°C. The support is then printed with the desired information-bearing marking or pattern and the printed labels or label strip is then dried again at a temperature below that at which substantial cross-linking occurs, generally below 100° C.

Labels produced with such resin systems are applied under heat and pressure in a suitable heat sealing press at a temperature in excess of the softening temperature of the resin used. At these temperatures rapid cross-linking of the resin occurs with the formation of a permanent bond to the article being marked, the bond and the label itself then being capable of withstanding repeated laundering and dry chemical cleaning operations.

The following examples illustrate typical methods of producing heat-sealable labels according to the present invention and as shown on the drawing.

EXAMPLE I

A 40 gm. per sq. m. high wet strength paper of high absorbency was impregnated with 15 gm. per sq. m. (dry weight) of a mixture selected from Table I or Table II.

A coating of 25 gm. per sq. m. was applied to one side only, using the same mixture selected for impregnation and the coating dried, at a temperature below that at which the resin cross-links rapidly, i.e., below 100° C.

A design was then printed repetitively, using an ink selected from Table III, Nos. 1 to 13 using the resin selected for impregnation.

Drying was carried out at a temperature below that at which the resin cross-links rapidly, i.e., below 100° C. Conveniently the paper is manipulated in the form of a continuous strip which is formed into rolls. Labels were cut from the rolls prepared as above and were tested by being applied to a range of textile fabrics including cotton, linen, nylon, polyester, glass cloth, using a heat-sealing press giving application conditions of 200°C., 4 seconds, 40 lbs. per sq. in.

The fabrics with applied labels were then subjected to many cycles of the appropriate laundry treatment and showed good resistance up to 30–50 successive treatments.

Further tests were carried out applying labels onto wool, cellulose diacetate and acrylic fabrics at 180° C. seconds, 20 lbs. per sq. in., followed by hand washing or dry-cleaning.

These labels were still legible after 30–50 treatments.

EXAMPLE II

An 80 gm. per sq. m. closely woven cotton fabric was coated substantially on one side only, with 50 gm. per q. m of a mixture selected from Table I or Table II.

It was then printed repetitively on the opposite side using one or more inks selected from Table III. Nos. 1 to 13 without regard for resin type.

Labels prepared in this way were tested as in Example I and were found to be legible after the fabric was worn out.

EXAMPLE III

A 50 gm. per sq. m. viscose non-woven fabric was impregnated with 20 gm. per sq. m. of a mixture selected from Table I or Table II followed by coating with a similar mixture to about 30 gm. per sq. m. on one side only.

A repetitive design was then printed on the uncoated side using inks freely selected from Table III, Nos. 1 to 4. The printed side was then coated with a further 15 gm. per sq. m. of the mixture used for impregnation and coating.

Labels cut from these rolls were tested in a similar way to Example I, and were found to be legible when the fabric was worn out.

EXAMPLE IV

A 45 gm. per sq. m. high wet strength, highly absorbent paper, comprising 10% of carbon black, was impregnated and coated as Example I. This was then cut into sheets of a suitable size for screen printing.

It was then printed with an ink selected from Table I, Nos. 1 to 13, but of the same resin type used for impregnation, with industrial ethanol replaced by n-butanol.

It was tested in the same way as Example I, with similar results.

EXAMPLE V

A 35 gm. per sq. m. high wet strength, highly absorbent paper, was impregnated with 18 gm. per sq. m. of an ink selected from Table III, Nos. 1 to 13. It was then coated with 30 gm. per sq. m. of a mixture selected from Table I or Table II, using the same resin type.

Printing was carried out using a contrasting colour selected from Table III, Nos. 1 to 13.

It was tested in the same way as Example I with similar results.

EXAMPLE VI a. A 100 gm. per sq. m. high wet strength paper of low absorbency was coated on one side only with 50 gm. per sq. m. of a mixture selected from Table I or Table II.

It was then printed on the other side using an ink freely selected from Table III, Nos. 1 to 13.

These labels were intended for use by a linen hire organisation and are intended to carry in addition to the printed information individual markings. Cut labels were applied on to cotton or linen overalls at 250° C., 4 seconds, 60 lbs. per sq. m. in., and after application additional information was inserted such as the name of the lessee, date of contract, etc., by means of a laundry marking ball point pen (as supplied by Scripto Ltd). Labels formed in this way were found to withstand about 50 laundry operations.

b. By applying a transparent, unprinted transfer layer applied from a temporary support, as a protective covering, preferably using the same coating solutions or dispersions under the same conditions, the label could be made to last throughout the useful life of the garment.

Such transfer layer was prepared by coating a 60 micron film of cellulose triacetate with 15 gm. per sq. m. of a mixture selected from Table I or Table II and then dried. The dried coating was placed in contact with the label and subjected to heat the pressure under the same conditions as the labels, and the support film peeled off or allowed to detach itself.

EXAMPLE VII

A 38 micron film of regenerated cellulose was printed with an ink freely selected from Table III, Nos. 1 to 13 and then coated on both sides with 20 gm. per sq. m. of a mixture selected from Table I or Table II.

It was tested in the same way as Example I and found to offer similar resistance to repeated laundering.

EXAMPLE VIII

Labels were prepared in a similar way to Example I using a coating solution selected from Table I with three parts of a plasticiser selected from Table IV.

EXAMPLE IX

Labels were prepared in a similar way to Example I, using a coating mixture selected from Table II with 10 parts per 100 parts of resin dispersion of a plasticiser selected from Table V.

It will be understood that labels according to the present invention may be economically produced since an inexpensive class of support material may be used, typically a soft and absorbent paper, which is coated or impregnated with the resin solution or dispersion in fluent form, and then dried. Because of the absence of a temporary support the application of heat from the presser means used for applying it to the article to be marked is operative rapidly, permitting the application and bonding of the label to the article to be effected in a period of not more than 7 seconds at most in practical cases. Because the printed marking on the label is visible at all times, control of the printing during production of the labels is facilitated, and this easy visibility is also of advantage in facilitating the correct application of the label to the article to be marked. All these factors contribute in providing a low cost procedure for producing marking elements having information-bearing markings printed thereon. The resin component of these marking elements is converted into an insoluble, abrasion- and wash-resistant compound by heat and pressure. The printing ink itself is either converted into a similar compound or the printing ink is protected on each side by continuous layers of such cured compounds. The resulting marking elements are highly resistant to influences operative throughout the life of the article being marked, including resistance to wear and resistance to cleaning operations such as cleaning solvents, without substantial degradation of the information carried by the marking element.

In some cases it may be desired to improve the appearance of the labels after application to the article by utilising a presser member operative on the exposed surface of the transfer which embodies an engraved surface pattern or "grain" which may give a characteristic appearance, for example, a natural textile appearance, to the label while in position on the article.

What I claim is:

1. A marking element permanently attachable by heat and pressure to a surface to be marked, comprising a paper-like flexible permanent support sheet completely impregnated with a heat curing film-forming resin system, a further coating of a heat curing film-forming resin system on one side of said support and an information-bearing marking imprinted on the other side of said support, said marking also including a heat curing, film-forming resin system and said film-forming resin systems *being* selected from the group consisting of soluble polyamides, soluble copolyamides, and cross-linking acrylic resins and including alkylol or alkoxy alkyl groups under acid conditions for conversion of said resin system under said heat and pressure into an inert, insoluble and abrasion-resisting substance in situ on the surface to be marked.

2. A marking element according to claim 1, wherein the information-bearing marking is produced by means of a printing ink including a cross-linkable resin system.

[3. A marking element according to claim 1, wherein the information-bearing marking is protected by a transparent protective layer on the exposed surface.]

4. A marking element according to claim 1, wherein the resin system consists of a soluble polyamide in the presence of alkylol or alkoxy alkyl groups such that at said temperature above the softening temperature cross-linking of the polyamide occurs with the formation of an inert and insoluble compound bonding the label to the surface to be marked.

5. A marking element according to claim 4, wherein the soluble polyamide consists of a methoxy methyl derivative of a polyamide.

6. A marking element according to claim 4, wherein the resin system includes a soluble copolyamide in the presence of a cross-linking agent containing alkoxy alkyl groups.

7. A marking element according to claim 6 wherein the cross-linking agent is a formaldehyde resin containing alkoxy alkyl groups.

8. A marking element according to claim 1, wherein the resin system includes a cross-linking acrylic resin.

*9. A marking element permanently attachable by heat and pressure to a surface to be marked, comprising a paper-like flexible permanent support sheet completely impregnated with a heat curing film-forming resin system, a further coating of a heat curing film-forming resin system on one side of said support and an information-bearing marking imprinted on the other side of said support, said information-bearing marking being protected by a transparent protective layer consisting of a film-forming resin system, each of said film-forming resin systems being selected from the group consisting of soluble polyamides, soluble copolyamides, and cross-linking acrylic resins, and also including alkylol or alkoxy alkyl groups under acid conditions for convertion of said resin system under said heat and pressure into an inert, insoluble and abrasion-resisting substance in situ on the surface to be marked.*

*10. A marking element according to claim 1, wherein said information-bearing marking is protected by a transparent protective layer consisting of a film-forming resin system selected from the group consisting of soluble polyamides, soluble copolyamides, and cross-linking acrylic resins and including alkylol or alkoxy alkyl groups under acid conditions for conversion of said resin system under said heat and pressure into an inert, insoluble and abrasion-resisting substance in situ on the surface to be marked.*

* * * * *